Sept. 30, 1952    H. R. WEST ET AL    2,612,635
INDUCTION VOLTAGE REGULATOR
Filed Feb. 16, 1951
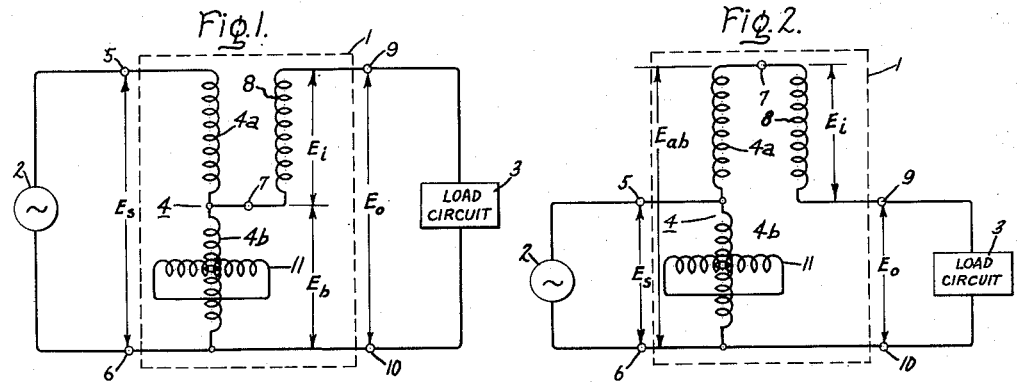
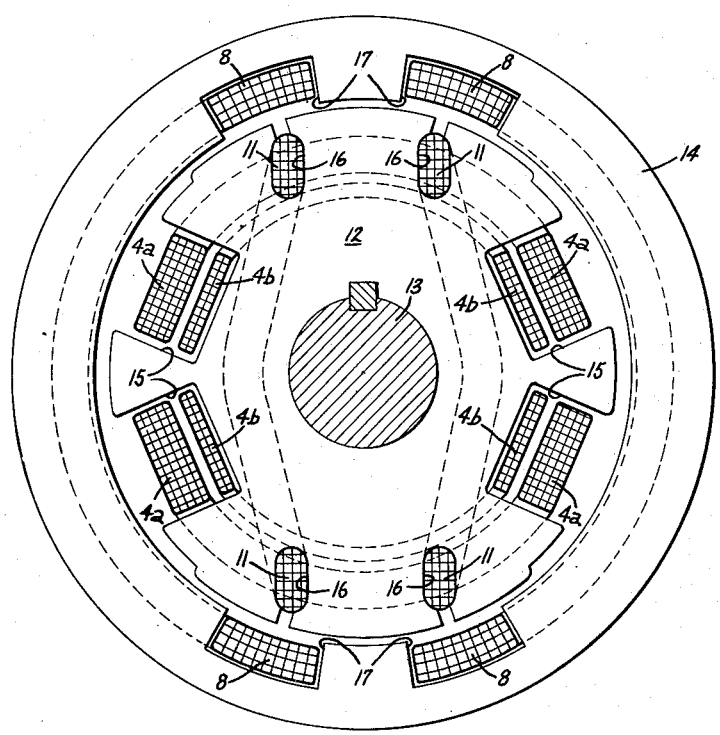
Inventors:
Harry R. West,
Myron E. Sayles,
by Ernest H. Britton
Their Attorney.

Patented Sept. 30, 1952

2,612,635

UNITED STATES PATENT OFFICE 2,612,635

INDUCTION VOLTAGE REGULATOR

Harry R. West and Myron E. Sayles, Pittsfield, Mass., assignors to General Electric Company, a corporation of New York Application February 16, 1951, Serial No. 211,236

3 Claims. (Cl. 336—79)

Our invention relates to induction voltage regulators and more particularly to previous arrangements employing both transformers and induction voltage regulators.

The conventional induction voltage regulator, as is well known in the art, comprises a primary winding mounted upon an angularly positionable rotor positioned within a stator containing a stationary secondary winding. The primary winding is connected in shunt relationship across a source of supply voltage and the secondary winding is connected in series relationship in the output circuit, which is also connected across the supply voltage. The inductive coupling between the primary and the secondary, and thus the voltage induced in the secondary, is varied by changing the angular position of the rotor, both the coupling and the induced voltage being maximum when the axes of the primary and secondary windings are parallel and essentially zero when the said axes are at right angles. The voltage induced in the secondary winding is always directly in or directly out of phase with the voltage across the primary winding so that as the rotor is turned through 180° the output voltage of the regulator varies from the arithmetical sum of the supply voltage and the maximum induced secondary voltage to the arithmetical difference of these voltages. The maximum induced secondary voltage is, of course, dependent upon the turns ratio between the primary and secondary windings. For example, if a regulator has 100 turns on its primary winding and 50 turns on its secondary winding, the maximum voltage induced in the secondary is 50% of the supply voltage applied to the primary winding. As the rotor is turned through 180°, the voltage output of the regulator varies from 50% to 150% of the supply voltage. Thus, conventional regulators have had an output voltage range spanning twice the maximum voltage induced in the secondary and centered about the supply voltage.

In many applications of induction voltage regulators, a voltage output range, corresponding to 180° rotor travel, is desired which is not centered about the supply voltage. For example, the output voltage range of 0% to 100% of the supply voltage is often called for with the fine average variation of 1% change in output voltage per 1.8° of rotor travel. Obviously, with a conventional regulator capable of providing zero voltage output, the maximum voltage output must be 200% of the supply voltage and the average variation must be coarser, being 2% change per 1.8° of rotor travel. For another example, the output voltage range from 140% to 160% of the supply voltage might be called for with the fine average variation of 1% of the supply voltage per 9° of rotor travel. Again, with a conventional regulator capable of providing 160% supply voltage output, the minimum voltage output must be 40% of the supply voltage and the average variation is considerably coarser, being 1% of the supply voltage per 1.5° of rotor travel.

In the past, this difficulty has been overcome by providing a transformer or auto transformer to step the supply voltage up or down to the center point of the voltage range desired. In the case of the first-mentioned foregoing example, a transformer may be employed to step supply voltage down to 50% of its value and this lower voltage used to excite a conventional induction voltage regulator having a 1:1 winding ratio. The output voltage of the regulator then varies from 0% to 100% of the supply voltage over 180° of rotor travel. In the case of the second mentioned foregoing example, a transformer may be employed to step the supply voltage up to 150% of its value and this higher voltage used to excite a regulator having a 15:1 winding ratio. The output voltage of the regulator will then vary from 140% to 160% of the supply voltage over 180° of rotor travel.

In realizing the desired results as indicated, a separate transformer and a separate regulator must be manufactured, mounted, and electrically connected. This is not only inconvenient, but also relatively costly. The transformer must be made to the proper ratio and the induction regulator designed for a non-standard supply voltage. In many instances standard regulators, which are insulated for much higher voltage than required by the specifications of a particular application, are uneconomically used simply because such uneconomical use is more expedient than building a regulator insulated for an unusual supply voltage value.

It is, therefore, an object of our invention to provide a single induction voltage regulator having an output voltage range not necessarily centered about the supply voltage value.

It is a further object of our invention to provide an induction voltage regulator capable of finer average adjustments of output voltages in a range of magnitudes appreciably different from the magnitude of the supply voltage.

It is a further object of our invention to provide a single induction voltage regulator for obtaining voltage variations previously obtained only by the use of a transformer and an induction voltage regulator in combination.

It is a still further object of our invention to provide a single induction voltage regulator affording more economical and convenient manufacture, mounting, and connection than presently afforded by a transformer and induction voltage regulator used in combination for the same purpose.

In carrying out our invention we provide an induction voltage regulator having a conventional type rotor and stator. The primary winding, or "shunt winding," is, however, composed of two sections serially connected to provide three terminals, one at the common junction of the two sections and the other two at the respective free ends of the two sections. A secondary winding, or "series winding," is connected to one of these terminals and the supply voltage is connected across the remaining two terminals. The output voltage is then the arithmetical sum or difference of the voltage induced in the secondary winding and the voltage tapped from the primary winding by the series or load circuit. The turns ratio of our invention is thus the ratio of the number of turns on the primary winding between the supply voltage terminals to the number of turns in the stationary secondary winding.

For a better understanding of our invention together with further objects and advantages thereof, reference should now be had to the following description and to the accompanying drawing in which: Fig. 1 is a simplified schematic diagram illustrating the electrical connections and associated voltage supply and load circuits for one embodiment of our invention; Fig. 2 is the same as Fig. 1 except that it illustrates another embodiment of our invention; and Fig. 3 is a sectional view of an induction voltage regulator constructed in accordance with our invention.

In Figs. 1 and 2, we have schematically shown an induction voltage regulator 1, enclosed by dashed lines, and associated therewith a source of alternating supply voltage 2 and a load circuit 3. A primary winding 4, which is mounted upon the rotor of the regulator, is shown comprising two sections 4a and 4b serially connected to provide three terminals 5, 6, and 7, two of which are at the extremities of the primary winding 4 while the other is at the common junction point of sections 4a and 4b. The source 2 is connected to input terminals 5 and 6. A secondary winding 8, which is mounted on the stator of the regulator, is shown connected to the remaining terminal 7. The secondary winding 8 is then connected in series relationship with the load circuit 3, which is connected to output terminals 9 and 10. A short circuited winding, commonly known as a tertiary winding 11, is shown at right angles to the primary winding 4. This form of illustration is used to indicate that the tertiary winding 11 is mounted on the rotor of the regulator with its axis at right angles to the axis of the primary winding 4, but that it is not connected by conductors to the primary winding 4. The tertiary winding 11, as is well known in the art, serves to reduce the reactance presented by the secondary winding 8 to current flowing through the load circuit 3. The turns ratio of the regulator is defined as the ratio of the number of turns on the primary winding 4 between input terminals 5 and 6 to the number of turns on the stationary secondary winding 8.

Turning now to Fig. 3, in the sectional plan view of our induction voltage regulator we have shown a laminated rotor member 12, mounted upon an angularly positionable shaft 13, and a laminated stator member 14. Rotor 12 and stator 14 are provided with slots therein, as shown, for containing the windings of the regulator in accordance with our invention. The particular regulator shown by way of illustrating our invention has a two pole rotor 12 and is provided with two slots 15 per pole for containing the primary winding 4. Further, the rotor 12 is provided with two slots 16 per pole for containing the tertiary winding 11 and the stator 14 is provided with two slots 17 per pole for containing the secondary winding 8. It is to be understood, however, that the number of poles as well as the number of slots per pole for the various windings of a regulator embodying our invention may be different from the values chosen for illustration dependent upon the KVA rating and cooling capacity of the regulator, in accordance with well known principles of electrical design.

Section 4a is preferably equally distributed in all of the slots 15 used for the primary winding 4, as is section 4b. For a given load current on the regulator, section 4b will carry much less current than section 4a and may, therefore, be made smaller in conductor cross-section as indicated by Fig. 3. The equal distribution of the two sections 4a and 4b between the slots 15 eliminates transverse forces in the rotor and possible noisy operation that might result from unsymmetrical flux distribution if the sections were not so distributed.

Fig. 1 shows an embodiment of our invention suited to provide an output voltage range centered about some voltage value lower than supply voltage. For purposes of explanation, $E_s$ is designated as the voltage supplied to terminals 5 and 6 by source 2, $E_i$ as the voltage induced in the secondary winding 7, and $E_o$ as the output voltage across terminals 9 and 10 supplied to the load circuit 3. The voltage across section 4b, designated hereinafter as $E_b$, is some fraction of $E_s$ dependent upon the ratio of the turns in section 4b to the total number of turns in primary winding 4. $E_i$ is dependent in magnitude upon the regulator turns ratio and the particular angular position at which the rotor is instantaneously located. There are two positions of the rotor at which the axes of the primary winding 4 and the secondary winding 7 are parallel. At one of these $E_i$ has its maximum value and in phase opposition to $E_b$ so that $E_o$ has its minimum value, being equal to the arithmetical difference of $E_b$ and $E_i$. At the other such position, $E_i$ has its maximum value and in phase addition to $E_b$ so that $E_o$ has its maximum value, being the sum of $E_b$ and $E_i$. As the rotor is turned 180° between these two positions, $E_o$ varies from its maximum to its minimum value passing through the midpoint of its range, $E_b$, when $E_i$ is zero at position of the rotor for which the axes of the primary and secondary windings are mutually at right angles.

To carry further the first foregoing example, assume that $E_s$ is 100 volts, that sections 4a and 4b each contain 50 turns, and that secondary winding 8 contains 50 turns, so that the turns ratio is 2:1. $E_b$ is then 50 volts and the maximum value of $E_i$ is 50 volts. The output voltage range will then be 0 to 100 volts, i. e., 0% to 100% of $E_s$, corresponding to 180° of rotor travel.

When the load circuit presents an infinite impedance, the only current flowing in the regulator is the flux-establishing, or exciting, current. However, when the impedance of the load circuit is finite, and $E_o$ is finite, a current flows through the secondary winding 8 and the load circuit 3. Corresponding reflected currents flow in the primary and tertiary windings to exert magnetomotive forces which together are essentially equal and opposite to the magnetomotive force established by the load current flowing through the secondary winding 8. When the axes of the primary winding 4 and the secondary winding 8 are parallel, no current flows in the tertiary winding 11 and the counter magnetomotive force is established entirely by a smaller current flowing in the primary winding. Conversely, when the said axes are at right angles, no current (except the exciting current) will flow in section 4b and the counter magnetomotive force will be established entirely by current flowing in the tertiary winding 11. Thus, the inductive reactance presented by the secondary winding 8 to the flow of load current is substantially reduced, being limited to a small reactance caused by leakage flux. Also, the current in section 4b is always considerably less than the current flowing in section 4a, since the latter current is the sum of the exciting current, the load current, and the reflected primary current.

Fig. 2 shows an embodiment of our invention suited to provide an output voltage range centered about some voltage value higher than the supply voltage. The same principles of operation are present and the same symbolic designations may be employed in a brief explanation of this embodiment. However, in this case the designation $E_b$ will be replaced by the designation $E_{ab}$ which is defined as the voltage across section 4a and 4b in series. $E_{ab}$ is some voltage greater than $E_s$, its magnitude being dependent upon the ratio of the total number of turns in primary winding 4 to the number of turns in section 4b. Thus, in a manner similar to that explained for the embodiment of Fig. 1, $E_o$ varies from a maximum of $E_{ab}$ plus maximum $E_1$ to a minimum of $E_{ab}$ minus maximum $E_1$, corresponding to 180° of rotor travel, where the maximum value of $E_1$ is dependent upon the turns ratio of the regulator. The manner of current distribution is similar to that explained for the first embodiment of the invention.

To carry further the second foregoing example, assume that for the embodiment shown by Fig. 2 $E_s$ is 100 volts, that sections 4a and 4b contain 75 and 150 turns respectively, and that secondary winding 8 contains 10 turns so that the turns ratio is 15:1. $E_{ab}$ is then 150 volts and the maximum value of $E_1$ is 10 volts. The output voltage range is thus 140 volts to 160 volts, i. e., 140% to 160% of $E_s$, corresponding to 180° of rotor travel.

While the present invention has been described by reference to particular embodiments thereof, it will be understood that numerous modifications may be made by those skilled in the art without actually departing from the invention. We, therefore, aim in the appended claims to cover all such equivalent variations as come within the true spirit and scope of the foregoing disclosure.

What we claim as new and desire to secure by Letters Patent of the United States is:

1. An induction voltage regulator comprising a stator member provided with a first plurality of slots therein, an angularly positionable rotor member provided with a second plurality of slots therein, a primary winding mounted on said rotor member in a portion of said second plurality of slots, said primary winding having two winding sections in series relationship with each other and having two power input terminals and a third terminal, one of said terminals being connected to a point on said primary winding intermediate the other two terminals, each of said sections being equally distributed among said portion of said second plurality of slots, a secondary winding mounted on said stator member in said first plurality of slots with inductive relationship to said primary winding and having a terminal connected to said third terminal, and a tertiary winding mounted on said rotor in the remaining portion of said second plurality of slots, the axis of said tertiary winding being oriented at right angles to the axis of said primary winding.

2. An induction voltage regulator comprising a laminated stator provided with a first plurality of slots therein; an angularly positionable laminated rotor provided with a second plurality of slots therein; a primary winding mounted on said rotor in a portion of said rotor slots; said primary winding composed of two winding sections serially connected and provided with three terminals, two of said terminals being connected to the respective extremities of said primary winding for connection to a source of supply voltage and the third of said terminals being connected to the common junction point of said sections; each of said sections being evenly distributed among said portion of said rotor slots; a secondary winding mounted on said stator in said stator slots with inductive relationship to said primary winding and having a terminal connected to said third terminal; and a tertiary winding mounted on said rotor in the remaining portion of said rotor slots, the axis of said tertiary winding being oriented at right angles to the axis of said primary winding.

3. An induction voltage regulator comprising a laminated stator provided with a first plurality of slots therein; an angularly positionable laminated rotor provided with a second plurality of slots therein; a primary winding mounted on said rotor in a portion of said rotor slots; said primary winding composed of two winding sections serially connected and provided with three terminals, two of said terminals being at the respective extremities of one of said sections for connection to a source of supply voltage, and the third of said terminals being at the free extremity of the other of said sections; each of said sections being evenly distributed among said portion of said rotor slots; a secondary winding mounted on said stator in said stator slots with inductive relationship to said primary winding and having a terminal connected to said third terminal; and a teriary winding mounted on said rotor in the remaining portion of said rotor slots, the axis of said tertiary winding being oriented at right angles to the axis of said primary winding.

HARRY R. WEST.
MYRON E. SAYLES.

REFERENCES CITED

The following references are of record in the file of this patent:

UNITED STATES PATENTS

| Number | Name | Date |
|---|---|---|
| 620,283 | Cowan | Feb. 28, 1899 |
| 1,672,703 | West | June 5, 1928 |

FOREIGN PATENTS

| Number | Country | Date |
|---|---|---|
| 263,954 | Italy | Apr. 8, 1929 |